United States Patent
Lyons et al.

(10) Patent No.: US 6,282,196 B1
(45) Date of Patent: Aug. 28, 2001

(54) DYNAMIC BUILD-OUT APPROACH FOR USE IN PACKET VOICE SYSTEMS

(75) Inventors: Terry Gregory Lyons, Princeton; Kotikalapudi Sriram; Yung-Terng Wang, both of Marlboro, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/900,000

(22) Filed: Jul. 24, 1997

Related U.S. Application Data

(60) Provisional application No. 60/043,537, filed on Apr. 14, 1997.

(51) Int. Cl.[7] .................................................. H04L 12/56
(52) U.S. Cl. .......................... 370/394; 370/395; 370/474; 370/517
(58) Field of Search .................................... 370/394, 395, 370/470–474, 468, 252, 517, 467, 229, 230; 375/244

(56) References Cited

U.S. PATENT DOCUMENTS

| | | | |
|---|---|---|---|
| 3,578,914 | * 5/1971 | Simonelli | 370/284 |
| 4,920,534 | * 4/1990 | Adelmann et al. | 370/474 |
| 5,150,358 | * 9/1992 | Punj et al. | 370/418 |
| 5,255,291 | * 10/1993 | Holden et al. | 370/474 |
| 5,287,347 | * 2/1994 | Spanke | 370/235 |
| 5,396,492 | * 3/1995 | Lien | 370/412 |
| 5,606,553 | * 2/1997 | Christie et al. | 370/394 |
| 5,699,369 | * 12/1997 | Guha | 714/774 |
| 5,717,691 | * 2/1998 | Dighe et al. | 370/401 |
| 5,790,538 | * 8/1998 | Sugar | 370/352 |
| 5,831,981 | * 11/1998 | Tanimura et al. | 370/395 |
| 5,870,397 | * 2/1999 | Chauffour et al. | 370/435 |

OTHER PUBLICATIONS

"An Algorithm for Playout of Packet Voice based on Adaptive Adjustment of Talkspurt Silence Periods" Pinto, et.al Local Computer Networks, 1999 LCN '99 Conference IEEE 1999 0–7695–0309–8/99 pp. 224–231, Aug. 1999.*

Adaptive Playout Mechanisms for Packetized Audio Applications in Wide–Area Networks, Ramachandran, et.al. INFOCOM '94 Networking for Global Communications 13'th proceedings IEEE 0743—166X/94 pp. 680–688 vol.2, Jun. 1994.*

Voice Communication Across the Internet: A Network Voice Terminal* Schulzrinne, Department of Electrical and cComputer Engineering University of Massachusetts, Amherst, MA 01003. Jul. 29, 1992.*

Modeling and ATM_Based Access Network for 3rd Generation Mobile Communication Networks by Marco Booldt, et.al., Vehicular Tech Conference 1998 VTC 98 48th IEEE vol. 3, pp. 2590–2593, vol. 3, Apr. 1998.*

Transmission of compressed voice over integrated services frame relay networks: priority service and adaptive buildout delay. by Dong, L; Kay,A.R.;Mahmoud, S.A., Apr. 1994.*

* cited by examiner

*Primary Examiner*—Chau Nguyen
*Assistant Examiner*—Soon-Dong Hyun
(74) *Attorney, Agent, or Firm*—J. J. Opalach

(57) ABSTRACT

In a packet voice system, a dynamic build-out delay approach in a receiver during the duration of a call. In particular, the build-out delay is applied at least twice during the duration of the call. In one embodiment, a packet voice system includes an ATM Adaptation Layer Type 2 (AAL-2) and Service Specific Convergence Sublayer (SSCS) System. The receiver portion of the SSCS System recovers AAL-2 packets and plays back the compressed audio to a voice decoding element. In providing playback, the receiver applies the build-out delay at the start of each talk-spurt. The voice decoding element provides an uncompressed audio stream. In another embodiment, the receiver portion of the SSCS System applies the build-out delay at the start of the each talk-spurt as a function of the length of the previous silence interval.

12 Claims, 11 Drawing Sheets

PACKET HEADER (3 OCTETS)

DYNAMIC BUILD-OUT APPROACH FOR USE IN PACKET VOICE SYSTEMS

CROSS-REFERENCE TO RELATED APPLICATION

This application claims priority of Provisional Application Ser. No. 60/043,537 which was filed Apr. 14, 1997.

FIELD OF THE INVENTION

This invention relates generally to communications and, more particularly, to packet voice systems.

BACKGROUND OF THE INVENTION

Asynchronous transfer mode (ATM) networks carry fixed sized cells within the network irrespective of the applications being carried over ATM. At the network edge or at the end equipment, an ATM Adaptation Layer (AAL) maps the services offered by the ATM network to the services required by the application. There are a number of industry standards and proposed standards covering various AALs. In particular, "B-ISDN ATM Adaptation Layer Type 2 Specification," draft Recommendation 1.363.2, November 1996, of ITU-T (herein referred to as AAL-2) provides for efficient ATM transport of small, delay-sensitive packets in such applications as packet voice systems.

In such a packet voice system, audio is transmitted in packets. Silences are suppressed (i.e., durations when signal power is below a predefined threshold). A sequence of audio packets, starting from the end of a silence duration to the beginning of the next silence duration, is referred to herein as a "talk-spurt." A transmitter provides each packet with a sequence number. The range of sequence numbers is typically finite and repeats. For example, there may be eight sequence numbers, 0–7. At the start of the first talk-spurt, the first transmitted voice packet includes the sequence number 0. After the first eight packets are transmitted the sequence numbers begin to repeat, starting again at 0. During silent intervals, the transmitter still counts sequence numbers such that the packet at the start of the next talk-spurt receives a sequence number just as if the silence interval had, instead, contained voice packets.

Upon receiving the first packet of a call, the receiver waits for an initial period of time, referred to herein as the "build-out" delay, before reconstructing and playing out the audio signal during a connection, or call. Once the build-out delay has passed, the receiver reconstructs the audio signal using the recovered sequence numbers to re-order received packets for the duration of the connection. Unfortunately, the use of sequence numbers, by themselves, and a single build-out delay for the entire call does not mitigate other anomalies present in packet voice systems due to packet delay and packet loss.

SUMMARY OF THE INVENTION

We have realized that it is desirable to use a dynamic build-out delay approach in a receiver during the duration of a call. In particular, the build-out delay is applied at least twice during the duration of the call.

In an embodiment of the invention, a packet voice system includes an AAL-2 and Service Specific Convergence Sub-layer (SSCS) System. The receiver portion of the SSCS System recovers AAL-2 packets and plays back the compressed audio to a voice decoding element. In providing playback, the receiver applies the build-out delay at the start of each talk-spurt. The voice decoding element provides an uncompressed audio stream.

In another embodiment of the invention, the receiver portion of the SSCS System applies the build-out delay at the start of the each talk-spurt as a function of the length of the previous silence interval.

DETAILED DESCRIPTION

Figure 1:
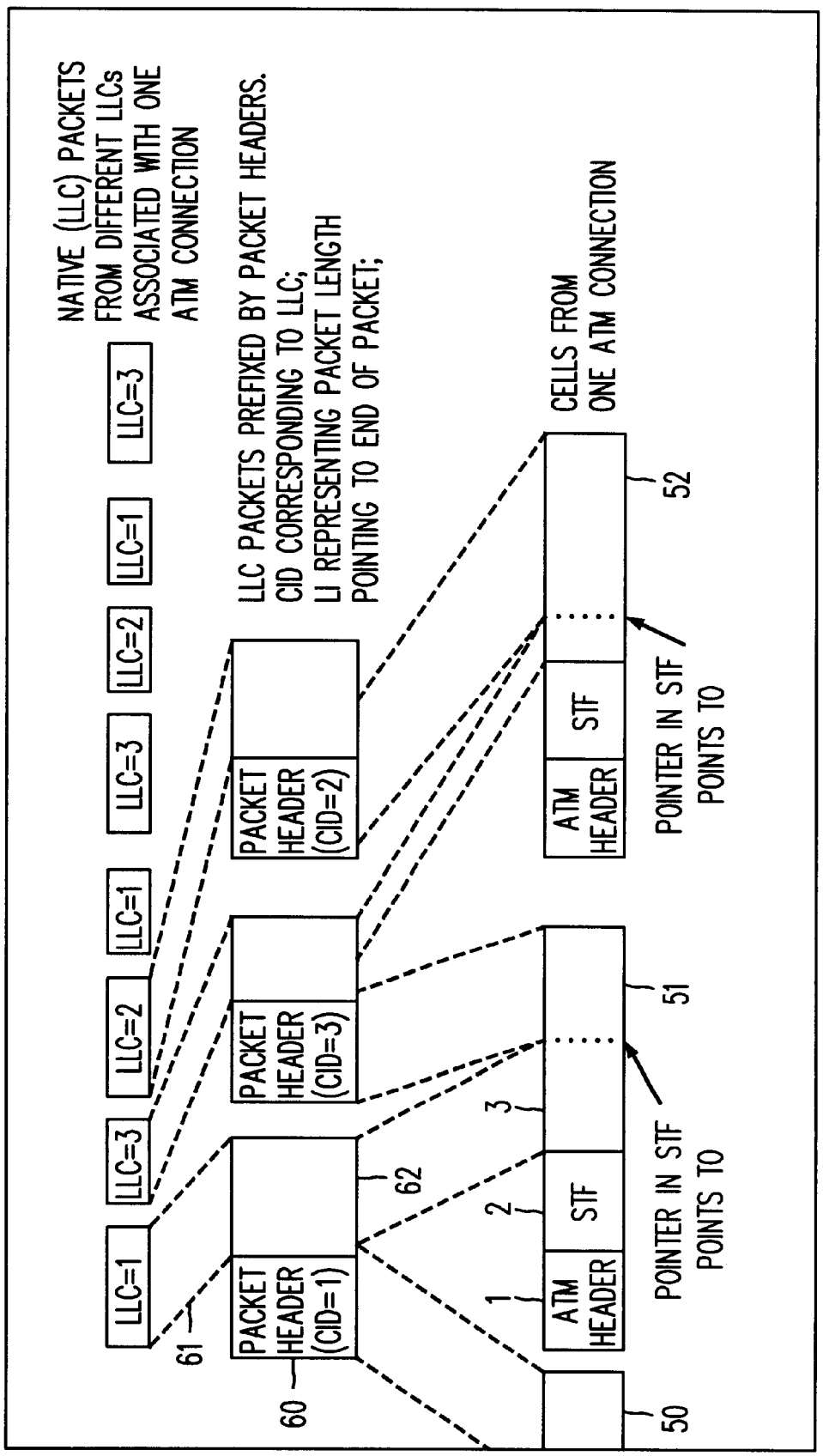
FIG. 1 shows an illustrative ATM cells and AAL-2 formatting.

Before describing an illustrative embodiment of the invention, some background information on ATM Adaptation Layers (AALs) and, more particularly, AAL-2, is provided. AAL-2

ATM networks carry fixed size (53 octets) cells within the network irrespective of the applications being carried over ATM. To support applications in native protocol mode, a Terminal Adapter (TA) at the network edge acts as an 'ATM user' and implements an ATM Adaptation Layer (AAL) to map the services offered by the ATM network to the services required by the application. In cases where ATM is terminated at the end user equipment, the AAL entity is implemented there. AAL-1 has been defined for Constant Bit Rate (CBR) traffic requiring tight delay and jitter control (e.g., see ITU-T Recommendation I.363.1 B-ISDN ATM Adaptation Layer AAL-1 Specification). Also AAL-3/4 (e.g., see ITU-T Recommendation I.363.3/4 B-ISDN ATM Adaptation Layer AAL 3/4 Specification) and AAL-5 (e.g., see ITU-T Recommendation I.363.5 B-ISDN ATM Adaptation Layer AAL-5 Specification) have been defined for bursty data. These AALs allow simple encapsulation of application 'packets' if each packet fits into one ATM cell. For larger application packets, a segmentation and reassembly (SAR) layer allows segmentation of a 'packet' at the transmitter, so each segment fits into an ATM cell, and reassembly of the original packet from the received ATM cells at the receiver. These AALs thus allow collection of enough information to fit into one ATM cell payload or segmentation of larger native mode packets into smaller units such that each smaller unit fits into an ATM cell payload. If native information units are smaller than an ATM payload, these AALs require partial fill of ATM cells.

However, many applications require ATM transport of 'small packets' that are smaller than the ATM cell size. Some of these applications are: PBX-to-PBX trunking for compressed voice with or without silence suppression; ATM backbone for cellular/PCS wireless access; ATM trunking between circuit switches; and ATM backbone connectivity to packet telephony.

In applications like the ones mentioned above, there are two primary reasons to transmit small packets across ATM networks: (i) when small native packets are generated away from the ATM network and the packet boundaries need to be recovered at the destination outside ATM network; and (ii) when the bit rate of a native application is low and the requirement on the end-to-end delay prohibits accumulation of bits to fill an ATM cell before sending the cell out to its destination. In the latter case, small packets are generated even if the packetization is done at the ATM network edge. Use of an ATM network to connect base stations to vocoder groups in digital cellular systems is an example of the former. ATM trunking between circuit switches or circuit PBXs is an example of the latter.

For these applications, partial fill of ATM cells resulting from use of AAL-1, AAL3/4, or AAL-5, may cause unacceptable loss in bandwidth efficiency. This inefficiency is of concern especially when the total traffic demand needs low speed leased lines because of the high cost/bps (bits per second) of such lines. In many cases, this cost penalty may nullify many of the advantages offered by an ATM backbone. This necessitates use of an AAL for small packets such as AAL-2. The latter provides efficient transport of small native packets over ATM networks in such a way that allows very small transfer delay across the ATM network and still allows the receiver to recover the original packets.

AAL-2 treats the payloads from successive ATM cells from the same ATM connection as a byte stream in which variable length LLC packets are multiplexed. An illustration of ATM cells and AAL-2 formatting is shown in FIG. 1. An ATM connection comprises a plurality of ATM cells, a portion of which is represented by the sequence of ATM cells 50, 51, and 52. Each ATM cell comprises an ATM header 1 (as known in the art), an STF field 2 and a plurality of LLC packets 3 (defined below). Each LLC packet, as represented by LLC packet 60 comprises a packet header 61 and a native LLC packet 62.

Figure 2:
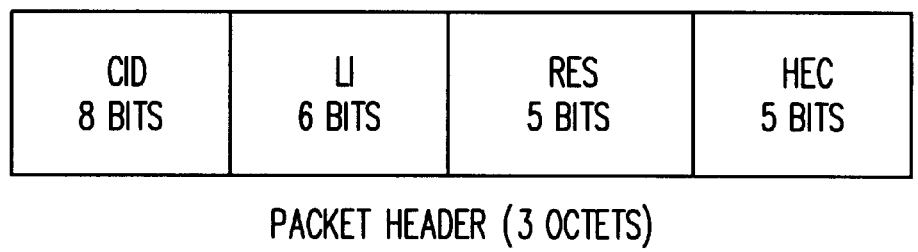
FIG. 2 shows a packet header of an LLC packet in accordance with AAL-2.

The packet header is 3 octets long and is shown in detail in FIG. 2. The packet header comprises four fields: a Channel ID (CID) field, a Length Indicator (LI) field, a Reserved (RES) field, and a Header Error Check (HEC) field.

The CID field is 8 bits long and identifies the LLC to which the packet belongs. (Referring briefly back to FIG. 1, it is can be observed that the CID field value for the associated LLC packet corresponds to the LLC number.) The CID field provides support for a maximum of 255 native connections (LLCs) over a single ATM VCC. As known in the art, an ATM cell header allows two levels of addressing: a Virtual Path Identifier (VPI) and Virtual Connection Identifier (VCI). A Virtual Path Connection (VPC) can have a number of VCCs. With a 16 bit VCI field, an ATM VPC can support up to $255 \times 2^{16}$ Logical Link Connections.

The LI field is 6 bits and indicates the length of the LLC packet (or native packet). The LI field is added to each LLC packet so that the end of variable length packets can be demarcated. The LI field allows specification of up to 63 octets. When the value of the LI field points beyond the end of the current ATM cell, the packet is split between cells (this is also illustrated in FIG. 1, where LLC packet 60 is split between ATM cells 50 and 51).

Since the primary driver for AAL-2 is packet telephony, and error detection is not essential for voice coding algorithms, error detection for native packets is not necessary. The purpose of error detection is to guarantee that CIID, LI and other critical protocol header fields do not get misinterpreted. This is accomplished in AAL-2 by the HBEC field in each packet header. The HEC field is 5 bits (e.g., see FIG. 2) and provides error detection over the packet header. This has the advantage of being able to discard only those packets whose headers are corrupted.

AAL-2 is partitioned into two sublayers, the Common Part Sublayer (CPS) and the Service Specific Convergence Sublayer (SSCS). The RES field comprises five bits, which are reserved or assigned to either the CPS or a Service Specific Convergence Function (SSCF) of the SSCS. The CPS provides the functions of multiplexing variable length packets from multiple sources into a single ATM virtual circuit and relaying these packets to form end-to-end AAL-2 connections. That portion (not shown) of the RES field assigned to the CPS are used to provide signaling such as a "More" bit to indicate that the current packet is segmented, signaling, or user information. The remaining portion (not shown) of the RES field assigned to the SSCF provides an application specific function, a different instance of being provided to each AAL-2 user. Examples of such functions are segmentation and reassembly of user flows into packets suitable for the common part, forward error control, identifying the voice coding algorithm, identifying the end of a speech burst, packet sequence number, etc. The SSCS can also be null. (At this point, the ITU-T standards body intends to specify SSCS protocols in future recommendations.) These SSCF-oriented bits are not interpreted by the AAL-2 CPS and are passed transparently from the transmitting SSCS to the receiving SSCS. The SSCS may use these bits for specific SSCF functions or to pass higher layer user-to-user communication transparently. In the context of this description, it is assumed that the earlier-described sequence number is a part of the RES field for each packet.

Figure 3:
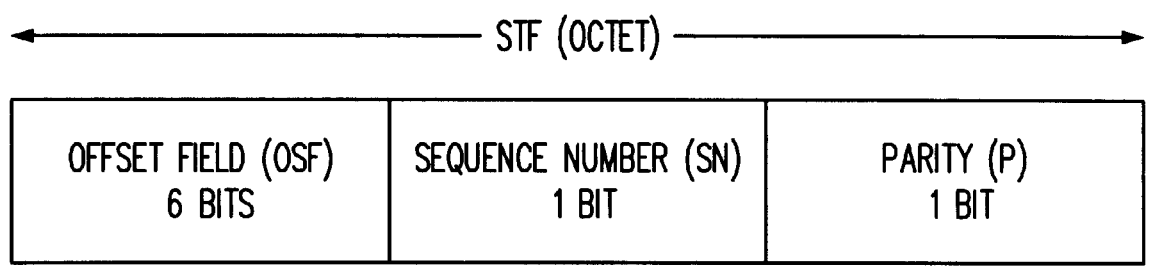
FIG. 3 shows a start field of an ATM cell in accordance with AAL-2.

As can be observed from FIG. 1, a Start Field (STF) is present at the beginning of each ATM cell payload from a given ATM connection. The format of the STF field is shown in FIG. 3. An STF field is 1 octet in length and comprises an Offset field (OSF), a Sequence Number (SN) field and a Parity (P) field.

While the LI field in each LLC packet allows self delineation once a packet boundary is identified, a cell loss or an error in a packet header results in the loss of packet delineation. In order to regain packet boundaries, the OSF field specifies the beginning of the first new packet in the current ATM cell payload. The OSF field is 6 bits in length and indicates the remaining length of the packet that (possibly) started in the preceding cell from this ATM connection and is continuing in the current cell. This approach guarantees resynchronization of packet boundaries in one ATM cell time after a delineation loss.

Given that a loss of an ATM cell, if not detected at the receiver, can misconcatenate packets, the SN field also exists. The one bit SN field provides a modulo 2 sequence numbering of cells and immediate detection of a single cell loss. It may be noted that this 1-bit sequence number is different from the earlier-described sequence number which is part of the RES field in the AAL-2 packet header.

Finally, like the packet header, the SN field and OSF field also require error detection. This is provided by the single parity bit of the P field, which provides odd parity.

It should be noted that it may be necessary to transmit a partially filled ATM cell in order to limit the packet emission delay. In this case, the remainder of the cell is padded with all-zero octets. A cell whose payload contains only the STF field and 47 padding octets can also be transmitted in order to meet some other needs such as serving a "keep-alive" function, satisfying a traffic contract, etc.

AAL-2 creates multiple levels of connections between two points: ATM virtual connections and AAL-2 Logical Link Connections (LLCs). The AAL-2 LLC in this case is defined to be a point-to-point connection, for example, between a base station and the vocoder group in the Mobile Switching Center (MSC) for cellular trunking, or between two PBX's or two switches for land-line trunking. The connection is defined to be bi-directional and the same CID is assumed to be used in both directions for a particular LLC. The set of CIDs available on an ATM VCC are known to both ends.

The negotiation procedures are symmetric, that is, either end of the AAL-2 connection is permitted to initiate a new LLC or request tear down of an LLC. A simple negotiation procedure is defined where the originating end proposes establishment of a new LLC with the use of a particular CID that is not in use and the other end can accept or deny the request. Bandwidth management and monitoring for the ATM virtual circuit is assumed to be handled at the ATM connection management level. No such monitoring is proposed per LLC. However, it is the responsibility of the two end points to guarantee resource availability within the ATM connection to support a new LLC. Such resource management is assumed to be handled in a service specific manner. Signaling needed for LLC set up and tear down between AAL-2 uses a predefined LLC (with CID=0).

Use of Sequence Numbers in Re-Playing Packets

Figure 4:
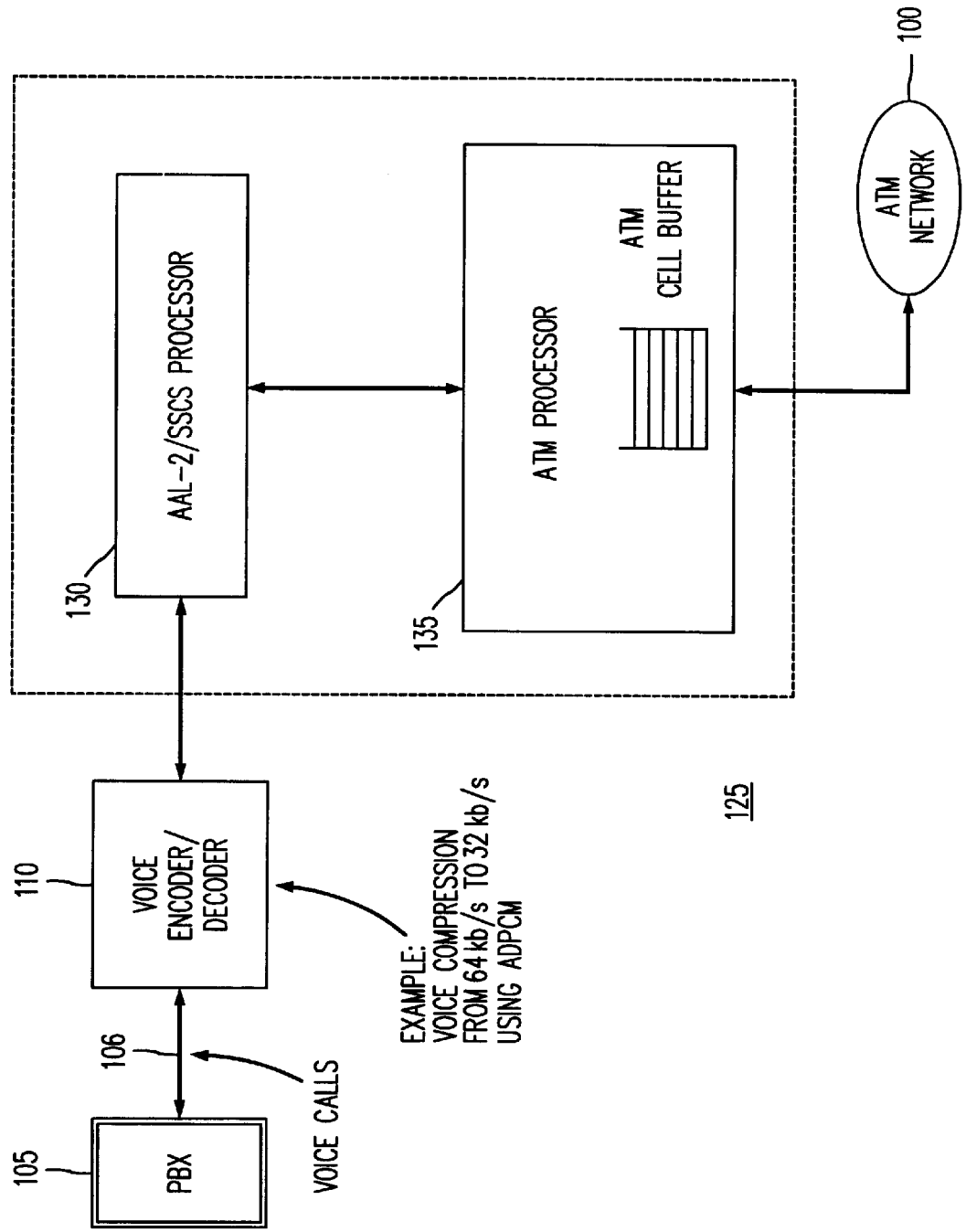
FIG. 4 shows a portion of a voice packet communications system.

A portion of a voice packet communications system is shown in FIG. 4. Other than the inventive concept, the elements shown in FIG. 4 are well-known and will not be described in detail. For example, although shown as a single block element, PBX 105 includes stored-program-control processors, memory, and appropriate interface cards. Similarly, Private Branch Exchange (PBX) 105 transmits and receives a plurality of voice calls to voice encoder/decoder 110, via facility 106. The latter is representative of any number and type of communications facilities. To facilitate the description it is assumed that facility 106 is a DS1 facility (for each direction) as known in the art, which carries a plurality of calls. For each call, the audio information is a 64 kb/s (thousands of bits per second) bit stream in either direction. Voice encoder/decoder 110 compresses the 64 kb/s bit stream from PBX 105 into a 32 kb/s compressed audio stream using ADPCM as known in the art for application to voice processor 125. Similarly, in the other direction, voice encoder/decoder 110 decompresses the 32 kb/s compressed ADPCM bit stream provided by voice processor 125 into a 64 kb/s audio stream for application to PBX 105.

Voice processor 125 comprises AAL-2/SSCS processor 130 and ATM processor 135. In transmitting information toward ATM network 100, AAL-2/SSCS processor 130 converts the 32 kb/s compressed ADPCM bit stream into AAL-2 packets for application to ATM processor 135. In this conversion, as described further below, the SSCS portion of processor 130 performs silence suppression, assignment of sequence numbers; and background noise level notification. In the opposite direction, AAL-2/SSCS processor 130 receives AAL-2 packets from ATM processor 135 and depacketizes them. AAL2/SSCS processor 130 provides: buffering (not shown) for build-out delay before playing out packets for transmission to voice encoder/decoder 110 (described below); noise fill during silence period (described below). In playing out the packets, AAL-2/SSCS processor 130 makes use of sequence numbers to decide delayed packets and to maintain integrity in the play-out process (described below).

ATM processor 135 provides the following transmit functions: filling payload of ATM cells with AAL-2 packets; forming an ATM cell whenever the payload is filled-up or a timer (e.g., 2 milli-seconds (ms)) expires with at least one AAL-2 packet in the payload (whichever of the two events happens first); ATM cell header processing; placing ATM cells into a transmit buffer, etc. ATM processor 135 provides ATM cells to ATM network 100. ATM processor 135 receives ATM cells from ATM network 100 and provides the following receive functions: ATM cell header processing and error control; transferring AAL2 packets to AAL2/SSCS processing unit, etc.

Figure 5:
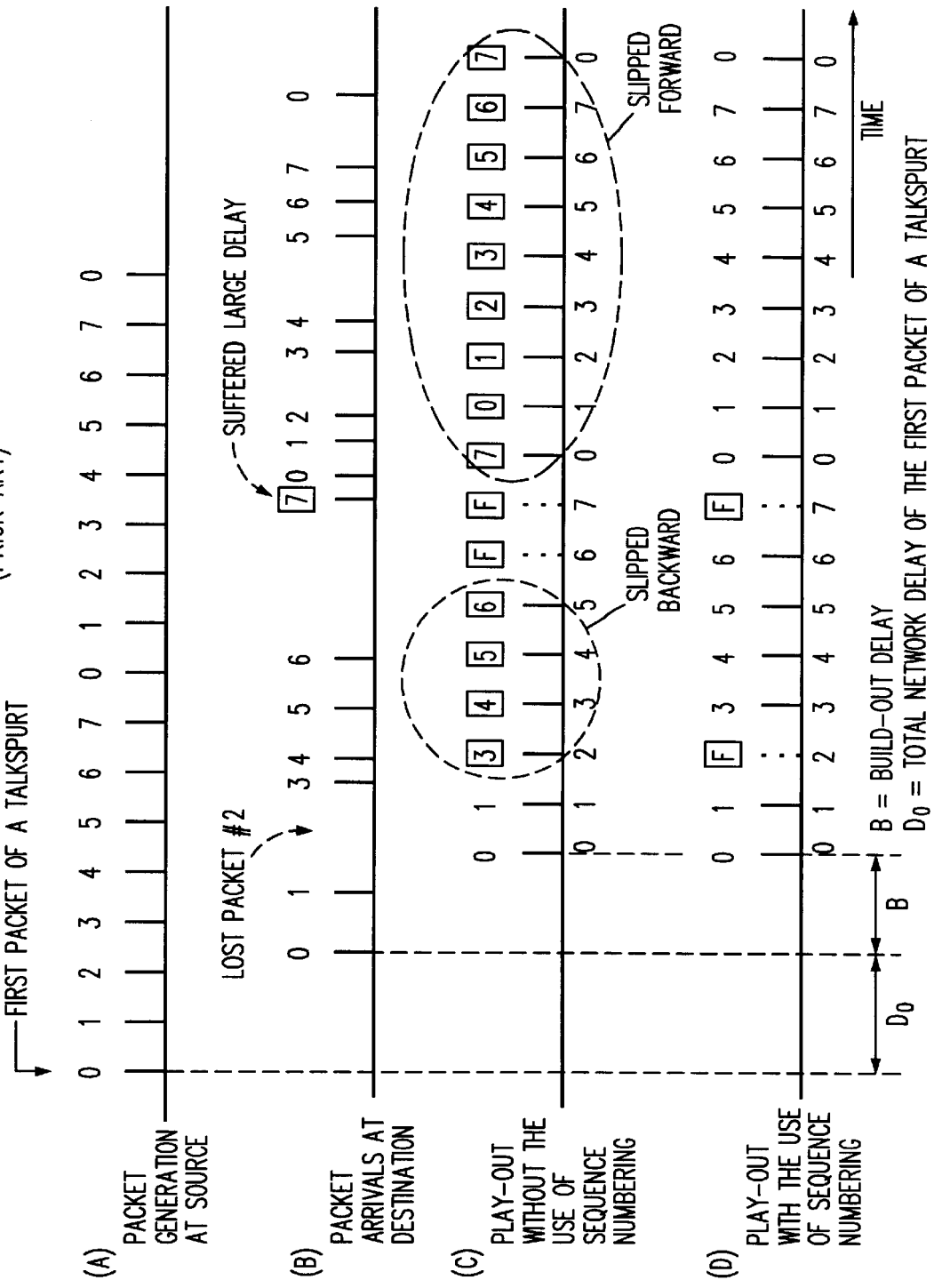
FIG. 5 shows a number of time-lines for illustrating sequence numbering and the use of a build-out delay during the duration of a call.

A set of time-lines are shown in FIG. 5 for illustrating the operation of an AAL-2/SSCS processor, sequence numbering, and the use of a build-out delay during the duration of a call.

Time-line (A) in FIG. 5 shows an illustrative talk-spurt comprising a number of packets. The latter is a stream of AAL-2 packets, which do not convey silent intervals. In this example, an AAL-2/SSCS processor creates an AAL-2 packet, each AAL-2 packet having an assigned sequence number, n, where $0 \leq n \leq 7$. As can be observed from FIG. 5, the sequence numbering repeats every n packets.

Time-line (B) shows the illustrative talk-spurt arriving at an AAL-2/SSCS processor. Each AAL-2 packets arrives in the order it is received. As can be observed from time-line (B), there is a variable delay in the arrival time of each packet (as to be expected in packet transmission). The parameter $D_0$ is defined as the total network delay of the first packet of a talk-spurt. The parameter B is defined as the build-out delay. Also, it is assumed that the first packet with the sequence number of 2 (hereafter referred to a packet 2) has been lost and that the packet 7 has suffered a larger delay than the other packets.

For illustrative purposes, time-line (C) shows the effect on play-out of received packets if sequence numbering were not provided on the received packet stream shown in time-line (B). The AAL-2/SSCS processor begins play-out after the build-out delay, B. Packets are simply played out in the order received at periodic time intervals. Since packet 2 was lost and packet 3 was already received before the play-out time of packet 2, packet 3 is played-out in place of packet 2 at time interval 2. This results in the received packets being "slipped backward" as shown on time-line (C) of FIG. 5. At time intervals 6 and 7, there are no packets in the receive buffer (not shown). As such the AAL-2/SSCS processor inserts "FILL" (F) packets, e.g., low-level noise or extrapolated speech, into the play-out stream. Finally, packet 7 arrives in time to be played-out at the next time interval 0. This results in the remaining packets being "slipped forward" as shown on time-line (C) of FIG. 5.

In contrast, time-line (D) illustrates the advantage of using sequence numbering during play-out. Again, the AAL-2/SSCS processor begins play-out after the build-out delay, B. Packets are played out of the receive buffer (not shown) in conjunction with the most recent sequence number at associated time intervals. Now, although packet 2 was lost and packet 3 was already received before the play-out time of packet 2, a fill packet (F) is played-out in place of packet 2 at time interval 2. As a result, the packets are not "slipped backward." At the associated time interval 3, packet 3 is played out. Packets continue to be played out in the correct sequence and time interval until packet 7. The latter has not yet been received for play-out at time interval 7 (as illustrated on time-line (B)). A fill packet (F) is played out instead. Finally, packet 7 arrives in time to be played-out at the next time interval 0. However, with sequence numbering, packet 7 is not played out at the next time interval 0. Instead, corresponding packet 0 is played out. As a result, the remaining packets are not "slipped forward." At this time, packet 7, which is already in the buffer, is recognized to have arrived late and hence is discarded.

Figure 6:
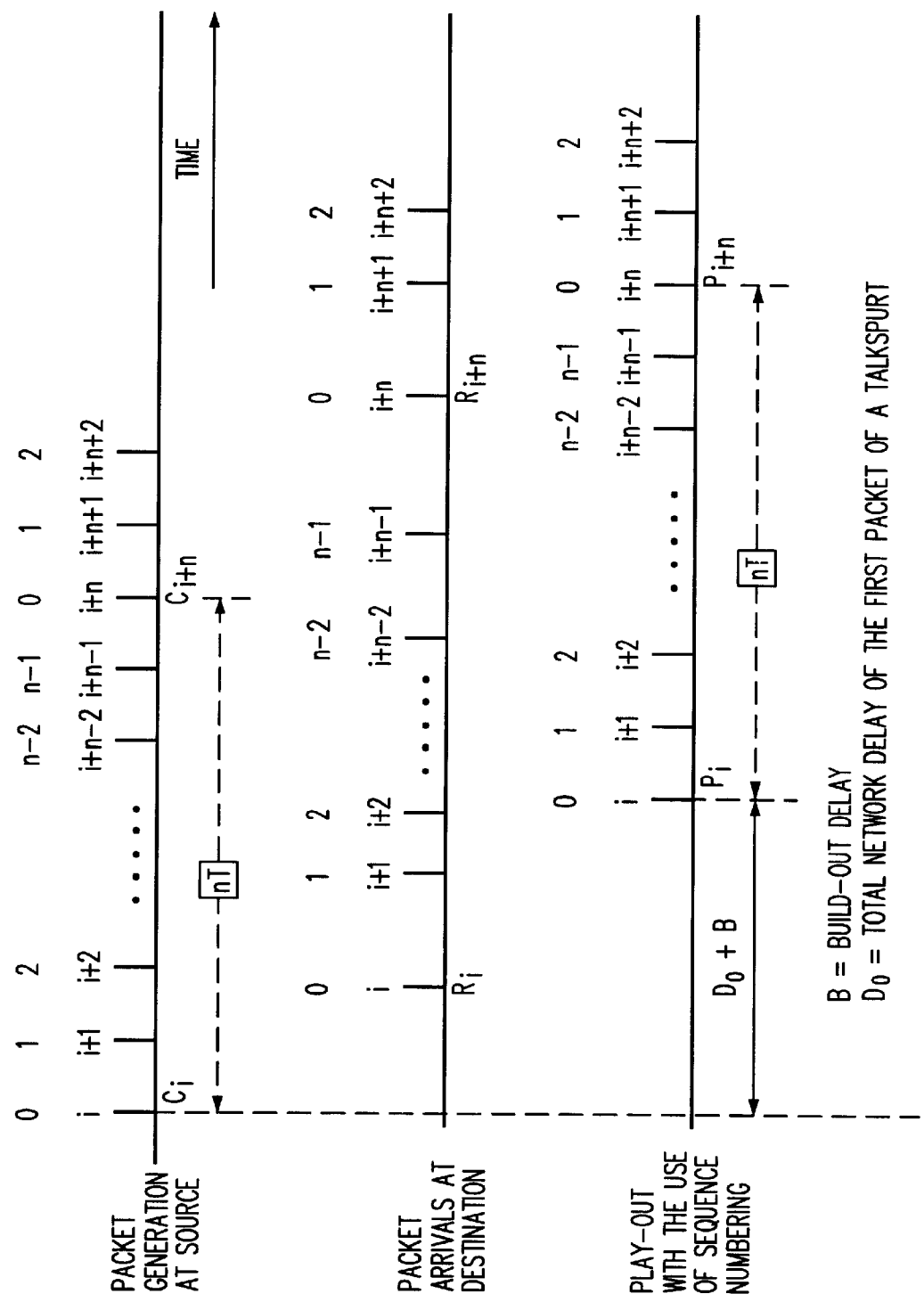
FIG. 6 shows a number of time-lines for defining packet-flow timing notations.

A set of time-lines are shown in FIG. 6 for reference purposes for the following definitions. Packet i refers to the ith packet of a talk-spurt. Let the first packet of a talk-spurt be defined as the 0th packet.

T=voice packetization interval,
B=initial build-out delay,
$C_i$=source generation time of packet i,
$R_i$=destination receive time of packet i,
$P_i$=scheduled play-out time of packet i, and
$D_i$=total network delay of packet i.

With the above definition, the following equations follow:

$$C_i = C_0 + iT,$$

$$R_i = C_i + D_i = C_0 + iT + D_i,$$

$$P_0 = R_0 + B = C_0 + D_0,$$

and $$P_i = P_0 + iT = C_0 + D_0 + B + iT.$$

The following are definitions of some packet anomalies.

As noted above, the packet sequence number counts 0 through (n−1) and rolls over; thus packet i and packet (i+n) carry the same sequence number. The value of n should be such that Forward and Backward Slips (defined below) occur rarely Late Packet: A packet i is said to be late if it is received after its scheduled playout time, i.e., $R_i \geq P_i$.

Figure 7:
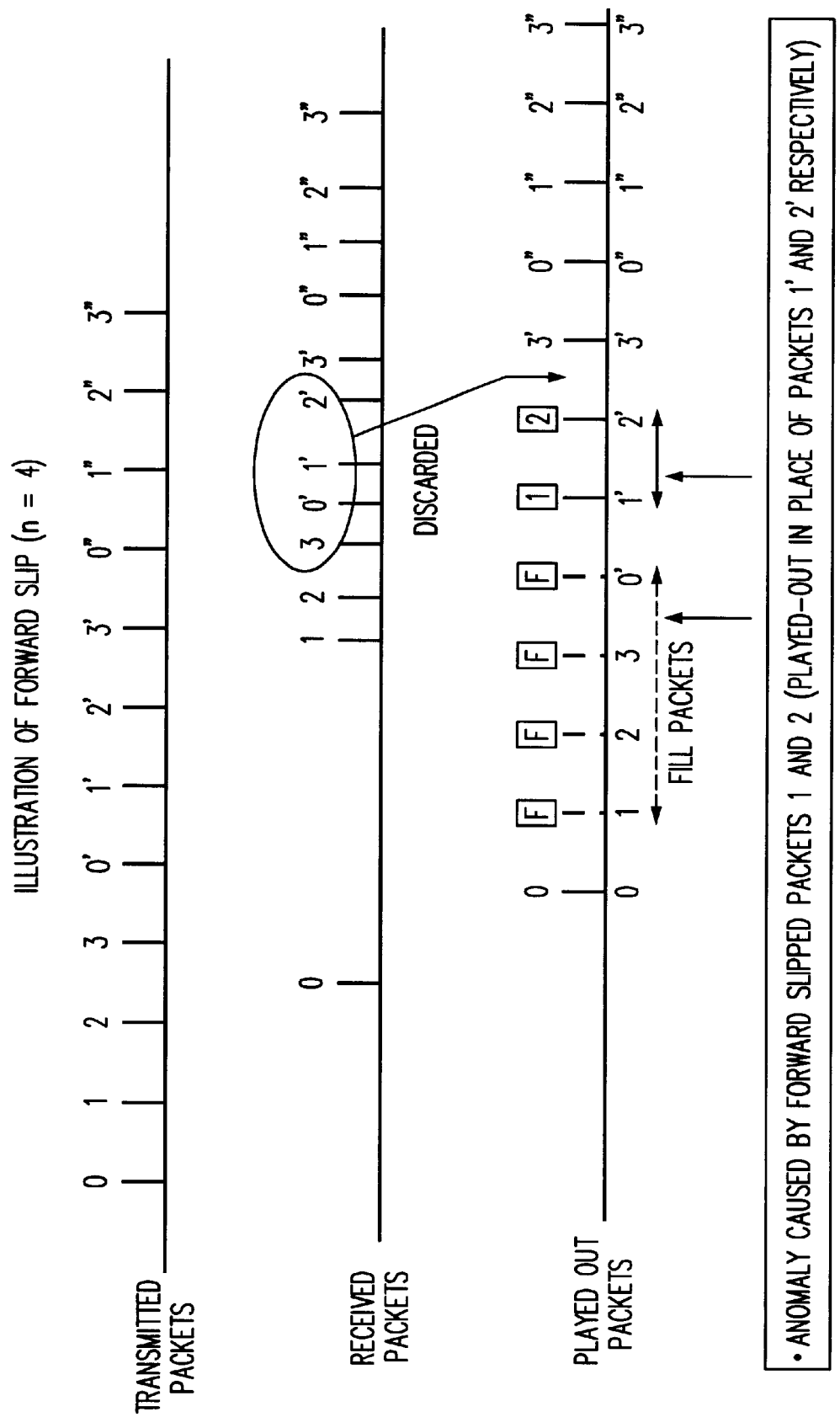
FIG. 7 illustrates a forward slip.

Forward Slip: A packet i arrives late but prior to the play-out time of packet (i+n); packets (i+1) through (i+n) are also late; and packet i is mistakenly played forward in place of packet (i+n). An illustration of a forward slip is shown in FIG. 7. The notation in FIG. 7 of 0 0', and 0'', is used to distinguish between packets with the same sequence number but arriving at different times. Here, packet 3" is more recent that packet 3. As is shown in FIG. 7, packet 1 and packet 2 are played out in place of packet 1' and packet 2' since these latter packets have not yet arrived. This causes a forward slip. When packet 3' arrives in time for play-out in interval 3', it is discovered by the receiver that there are two packets with sequence number 3 in the buffer (namely 3 and 3'). This results in discarding the packets currently existing in the buffer (3, 0', 1' and 2'), and playing out packet 3' in its correct position, thus restoring the order in the play-out process. The discarding of packets 3, 0', 1', and 2', potentially causes sample errors to ripple through the next many samples in the ADPCM decoder. Here, the sequence number, n, is illustratively equal to 4. The sequence number size should be chosen such that the probability of forward slips is very small.

Backward Slip: Packets i through (i+n−1) are lost (due to unrecoverable errors or buffer overflows in the network); packet (i+n) arrives early even prior to the play-out time of packet i; and packet (i+n) is mistakenly played early in place of packet i.

Figure 8:
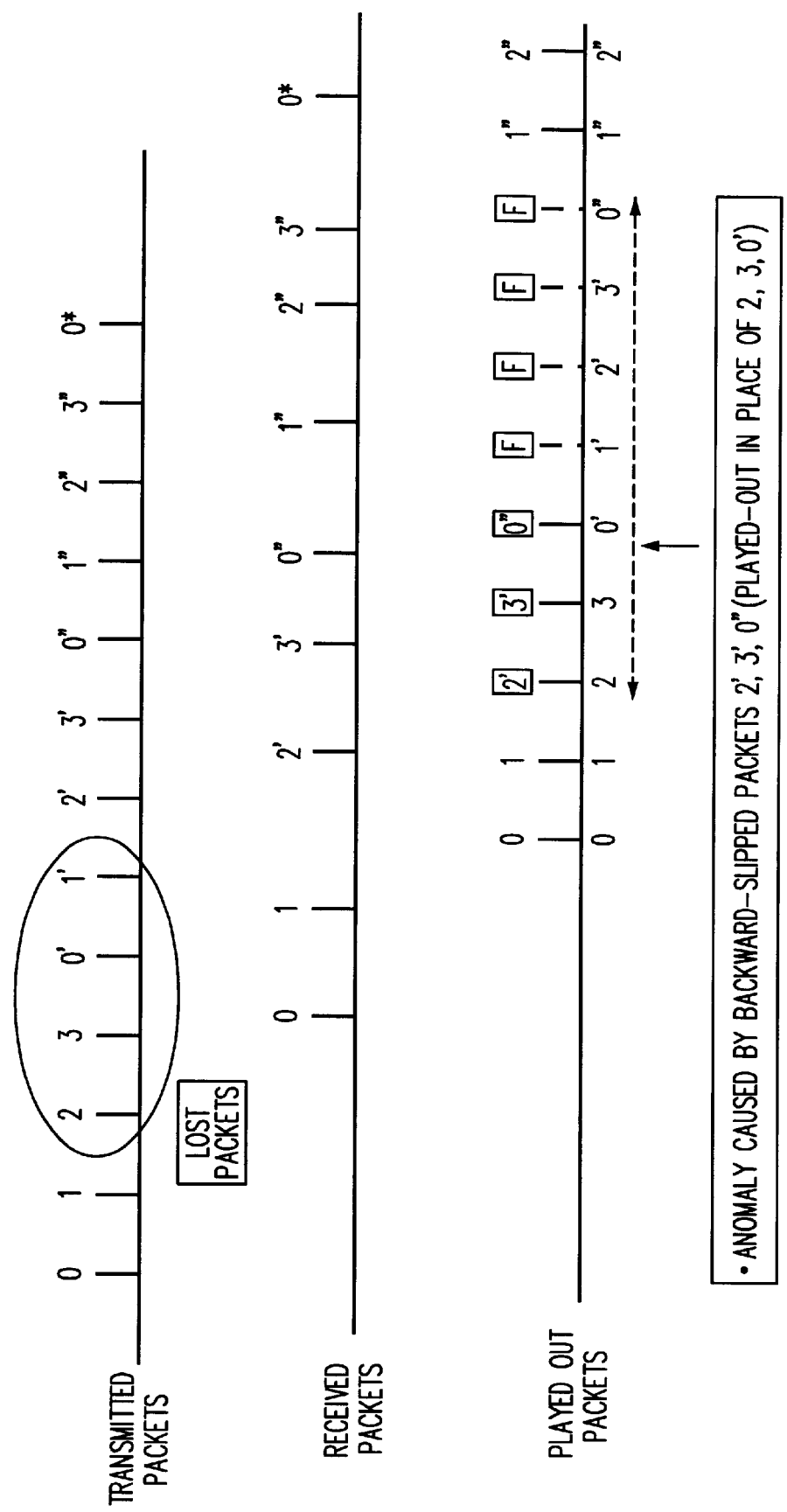
FIG. 8 illustrates a backward slip during the middle of a talk-spurt.

An illustration of a backward slip during the middle of a talk-spurt is shown in FIG. 8. Here, the backward slip causes a ripple effect in which three packets (2', 3', 0") are played too soon and four other packets (1', 2', 3', 0") are considered to be late/lost and fill packets are used in their places. However, a "lucky" (but not unexpected) forward slip restores order in the play-out starting from position 1" onward. Sequence number, n, should be selected large enough based on the consideration that the probability of loss of n successive packets of one voice source is very small.

Figure 9:
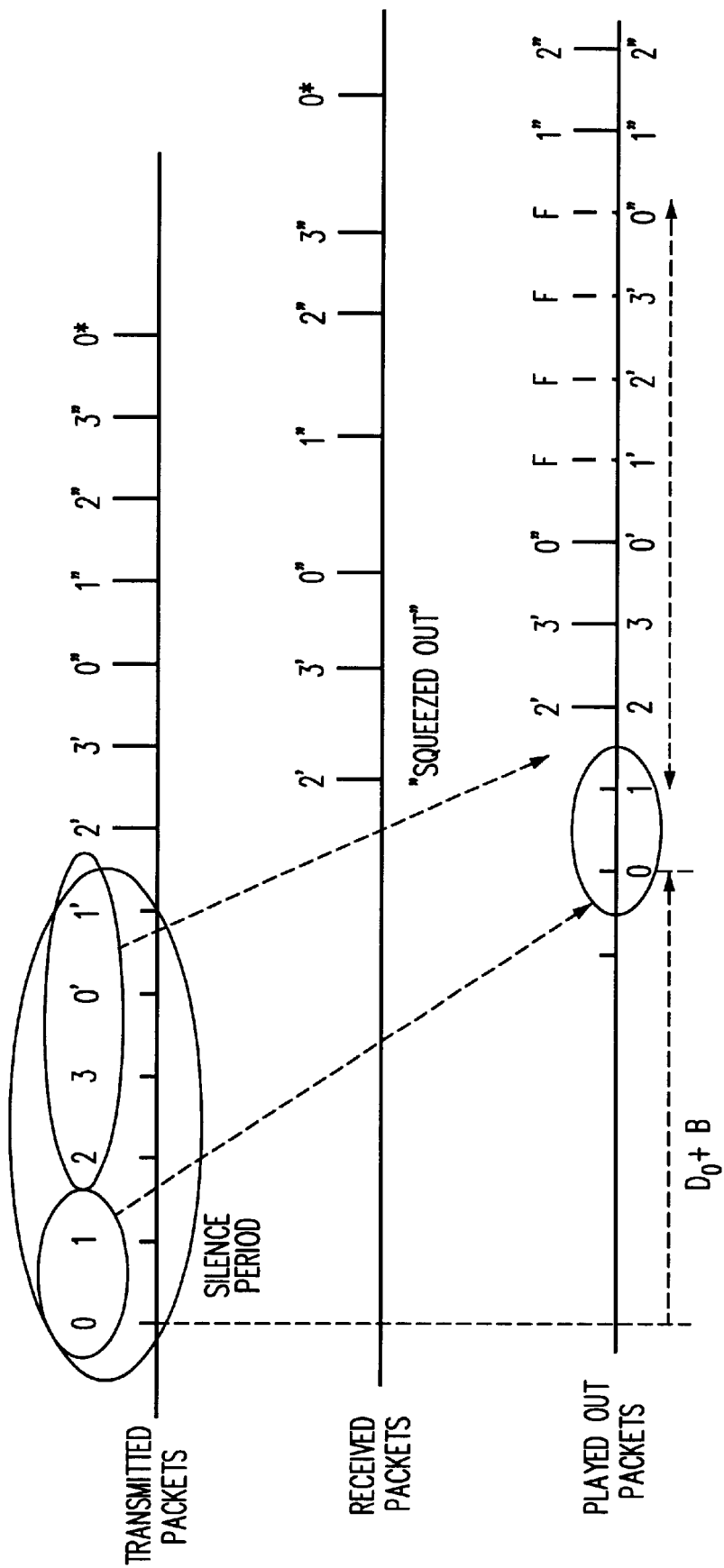
FIG. 9 illustrates a backward slip at the beginning of a talk-spurt.

An illustration of a backward slip at the beginning of a talk-spurt is shown in FIG. 9. Here, silence intervals are represented by small tick marks on each time-line. It should be remembered that no AAL-2 packets are transmitted representing silence. However, the respective AAL-2/SSCS processor continues to count sequence numbers. In this example, a backward slip at the beginning of a talk-spurt shortens the previous silence interval in the played-out voice (silence ticks 2, 3, 0', 1' are "squeezed out"). This causes a ripple effect in which three packets (2', 3', 0") are played too soon and four other packets (1', 2', 3', 0") are considered to be late/lost and fill packets are used in their places. Again, as in the previous example, a "lucky" (but not unexpected) forward slip restores order in the play-out starting from position 1" onward. Similarly, the sequence number, n, should be selected large enough based on the consideration that the probability of (i+n) packet arriving prior to play-out time of the ith packet is small.

As noted above, the value of the sequence number, n, can be selected to mitigate the effects of backward slip. Based on the understanding as illustrated in the above-mentioned FIGS., it can be reasoned that the probability of backward slipping can be kept small if the following probability, $P_R$, is small:

$$P_R = \mathrm{Prob}\{R_{i+n} < P_i\} = \mathrm{Prob}\{D_0 > D_{i+n} + nT - B\} < \mathrm{Prob}\{D_0 > W_L + nT - B\},$$

where $W_L$ is the lowest possible total network delay. Further, if $W_H$ is the 99th percentile of total network delay, than if n is chosen such that:

$$W_L + nT - B = W_H, \text{ or } n = \frac{(W_H - W_L + B)}{T};$$

then $P_R$ would be less than 0.01 or 1%. Further, if B is chosen to be the 99th percentile of the network queuing delays (as is normally done), then, $$B = W_H - W_L.$$

Hence, the desired value of n is as follows (based on backward slip considerations):

$$n = \frac{2(W_H - W_L)}{T}. \tag{1}$$

A similar analysis is shown below for mitigating the effects of forward slip, i.e., the probability of forward slipping can be kept small if the following probability PF, is small:

$$P_F = \mathrm{Prob}\left\{R_i > P_i + \frac{nT}{2}\right\}$$

-continued $$= \text{Prob}\left\{D_i > D_0 + B + \frac{nT}{2}\right\} \leq \text{Prob}\left\{D_i > W_L + B + \frac{nT}{2}\right\};$$

where $W_L$ is the lowest possible total network delay. Further, if $W_S$ is the 99.9th percentile of total network delay, then if n is chosen such that:

$$W_L + B + \frac{nT}{2} = W_S, \text{ or } n = \frac{2(W_S - W_L - B)}{T}; \quad (2)$$

then $P_F$ would be less than 0.001 or 0.1%.

Equation (1) was arrived at by considering Prob$\{R_{i+n} < P_i\}$. Hence, equation (1) is valid for backward slips at the beginning of a talk-spurt. However, for the case of backward slips during a talk-spurt, the probability of a backward slip is predominantly determined by the joint probability that packets i thorough (i+n−1) have been lost. It is possible to choose n such that the probability that n successive packets of one voice call are lost in an access multiplexer due to buffer overflows and/or unrecoverable transmission errors is very small. This approach of choosing n ensures that the probability of backward slips in mid-talk-spurt is small. This value of n is determined empirically by using a simulation of the system. For example, a value of n=4 is adequate to ensure the probability of backward slip during a talk-spurt is less than, or equal to, $10^{-6}$ for a range of system parameters and traffic loads of interest.

As described above, the value of n is determined by considering backward slips (both at the beginning and during a talk-spurt) and forward slips. A recommended value of n is selected in any number of ways. For example, a recommended value of n is the maximum of the three values obtained from forward slip, backward slip (in mid talk-spurt) and backward slip (at the beginning of a talk-spurt) considerations. Alternatively, each value of n from, e.g., equation (1), equation (2), and using n=4 (for mid-talk-spurt), is selectively weighted by, e.g., giving more weight to values of n for backward slip in the middle of a talk spurt and during forward slip than to values of n for backward slip in the beginning of a talk-spurt. Such weightings are determined empirically based on voice quality studies using mean opinion scores.

In the above description, it is assumed that build-out is used only once at the beginning of a call and is maintained at that value for the entire call. Alternatively, and in accordance with the inventive concept, the build-out delay is applied afresh to the first received packet of each talk-spurt. This approach causes the silence intervals to be modulated somewhat by the difference in the delay of the first packets of successive talk-spurts. This may not be a serious problem because typically silence durations are of the order of hundreds of milliseconds, while the packets delays are of the order of ten milliseconds. Dynamically applying a build-out delay during a call improves the chance of receiving successive packets in time for play-out when network delays vary. In other words, applying a build-out delay anew at the beginning of a talk-spurt during a call decreases the likelihood of missed packets when network delays, e.g., increase.

Figure 10:
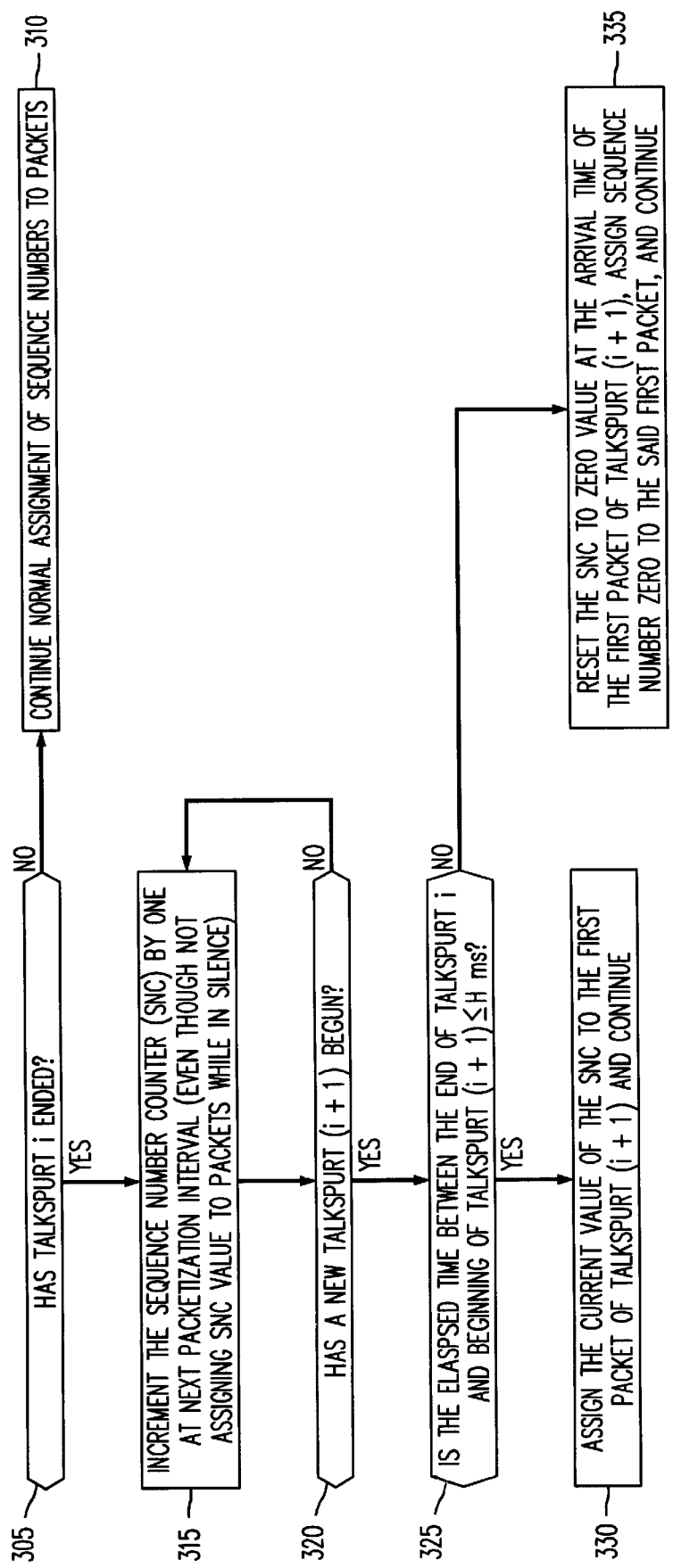
FIG. 10 shown an illustrative flow diagram for use in a transmitter.

An illustrative method, in accordance with the principles of the invention, for use in a transmitter for assignment of sequence numbers in transition from one talk-spurt to the next is shown in FIG. 10. Initially, it is assumed that the transmitter is sequentially assigning sequence numbers beginning with 0 at the start of the very first talk-spurt. In step 305, the transmitter detects if the current talk-spurt, i, has ended. If the current talk-spurt is still active, i.e., no silence intervals have been detected, the transmitter continues sequential assignment of sequence numbers. If the current talk-spurt, i, has ended, then the transmitter continues to increment the sequence number counter (SNC) by one at the next packetization interval (even though not assigning an SNC value to packets while in silence—in fact, with silence suppression there are no packets representing silence). In step 320, the transmitter detects if a new talk-spurt, i+1, has begun. If not, the transmitter continues to increment the sequence counter in step 315. If a new talk-spurt has begun, the transmitter determines, in step 325, if the elapsed time between the end of the previous talk-spurt, i, and the new talk-spurt, i+1, is less than, or equal to, a predetermined value H. If the elapsed time is greater than H, then, in step 335, the transmitter resets the SNC to 0 at the arrival time of the first packet of talk-spurt i+1, and assigns the sequence number 0 to this first packet and continues to step 305, etc. However, if the elapsed time is less than, or equal to, H, then the transmitter assigns the current value of the SNC to the first packet of talk-spurt, i+1, and continues to step 305, etc.

Figure 11:
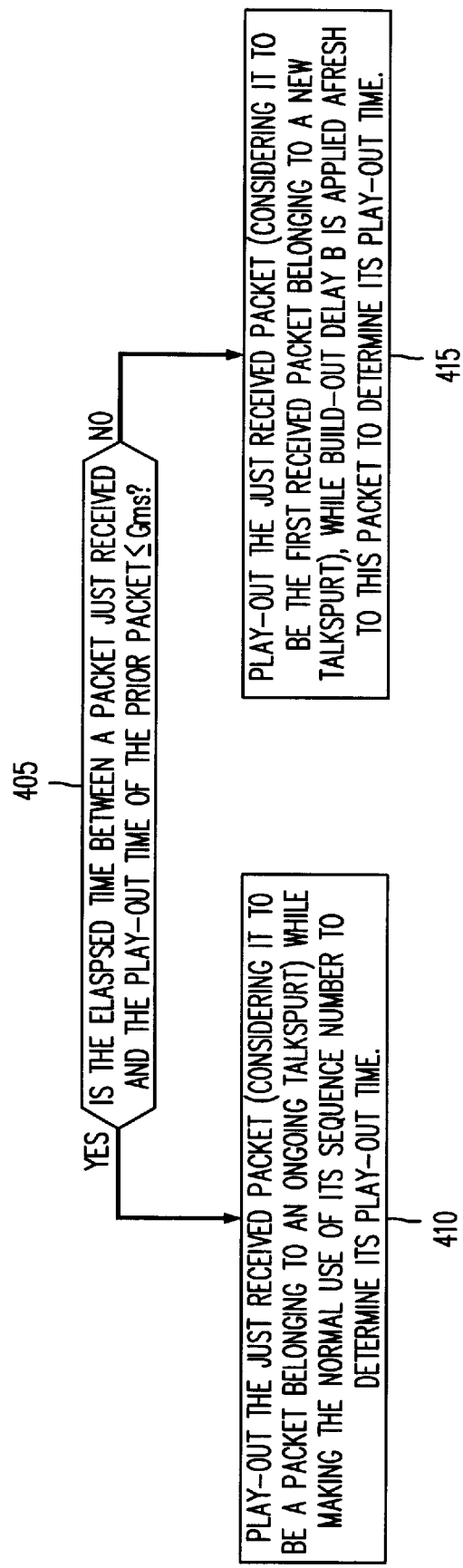
FIG. 11 shown an illustrative flow diagram for use in a receiver.

An illustrative method, in accordance with the principles of the invention, for use in a receiver for build-out delay updates in transition from one talk-spurt to the next is show in FIG. 11. In a receiver, at the start of every talk-spurt, the receiver determines, in step 405, if the elapsed time between a packet just received and the play-out time of a prior packet is less than, or equal to, G. If the elapsed time is greater than G, then the receiver, in step 415, plays-out the just received packet (considering it to be the first received packet belonging to a new talk-spurt), while build-out delay B is applied anew to this packet to determine its play-out time. (In this step, the detection of silent intervals greater than G cause the build-out delay B to be applied afresh. In this method, the build-out delay is dynamic in the sense that the play-out time of packets in each talk-spurt is a function of the delay experienced by the first packet of each respective talk-spurt and the silence duration preceding each respective talk-spurt.) However, if the elapsed time is less than, or equal to, G, then the receiver, in step 410, plays-out the just received packet (considering the packet to be part of an ongoing talk-spurt) while making normal use of the sequence number (of the just received packet) to determine its play-out time.

The values for H and G are design choices determined empirically as a function of the distribution of silence intervals. Illustratively, H=100 ms, assuming that the average silence duration is 600 ms. It is also assumed herein that the average packet delay variation is ~20 ms, voice talk-spurt durations average 400 ms, and a packetization interval, T, occurs every 5 ms. Generally, the value for H should be larger than the average packet delay variation and smaller than the average silence duration. The parameter G is subject to the same considerations and, for the purposes of this description, is illustratively equal to 100 ms.

It should be noted that the values of H and G are independent of, and can be different from, each other. For example, H could be chosen as very large, e.g., H→∞. In this context, the transmitter always goes through step 330. However, G is set equal to 100 ms.

Figure 12:
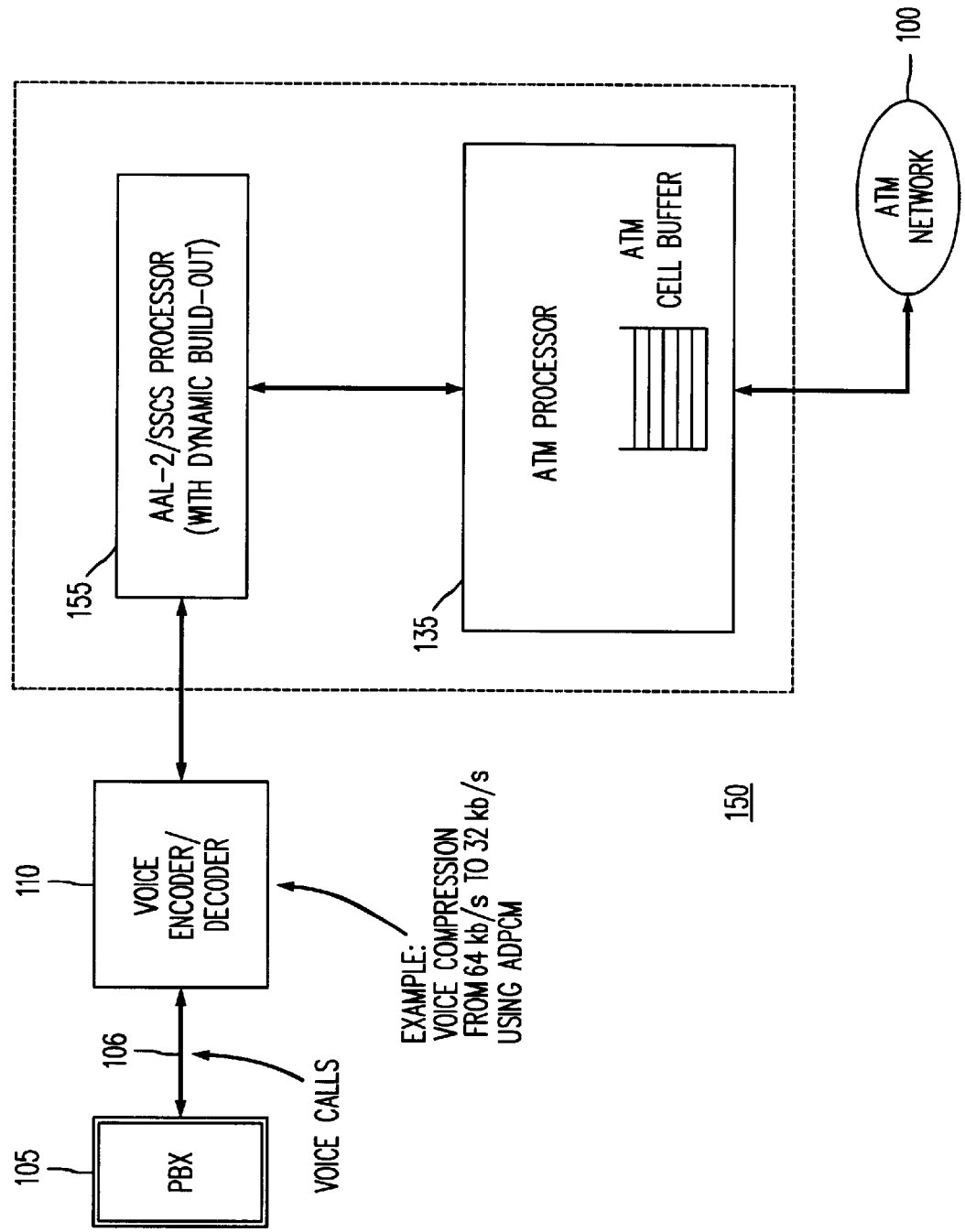
FIG. 12 shows an illustrative portion of a communications system embodying the principles of the invention.

An illustrative portion of a system embodying the principles of the invention is shown in FIG. 12. The elements of FIG. 12 are similar to the elements of FIG. 4 except for voice processor 150, which includes AAL-2/SSCS Processor 155 with dynamic build-out. The latter functions in accordance with the charts illustrated in FIGS. 10 and 11 in the transmission and reception of AAL-2 packets, respectively.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was illustrated in the context of ATM, other examples of transport networks over which packets of voice are transmitted are wire-line and wire-less networks, the Internet, and corporate Intranets. In the case of the Internet or Intranets, packets are transported using an Internet Protocol (IP) format.

What is claimed:

1. A method for use in a receiver, the method comprising the steps of:

receiving a stream of packets;

dynamically applying a build-out time delay to each received packet; and playing out each packet as a function of a sequence number of the packet and any applied build-out delay, wherein the dynamically applying step includes the steps of:

measuring an elapsed time between a play-out time of a prior packet and a received time for a current packet; and if the measured elapsed time is greater than a predetermined value, applying a build-out delay to the current packet for use during the Playing out step; wherein the predetermined value is indicative of a silent interval between packets exceeding a minimum value.

2. The method of claim 1 further comprising the step of establishing a call between a transmitter and the receiver, where the establishing a call step occurs prior to the step of receiving the stream of packets.

3. The method of claim 2 wherein the playing out step applies a build-out delay for the first packet in each call.

4. The method of claim 1 wherein the playing out step forms a signal representing compressed data from the received packets.

5. The method of claim 4 wherein the formed signal conforms to ADPCM encoding.

6. Apparatus comprising:

means for receiving a stream of packets;

means for dynamically applying a build-out time delay to each received packet and playing out each packet as a function of a sequence number of the packet and any applied build-out delay;

wherein the means for dynamically applying a build-out time delay measures an elapsed time between a play-out time of a prior packet and a received time for a current packet, and if the measured elapsed time is greater than a predetermined value, applies a build-out delay to the current packet for use when playing out the current packet; and wherein the packets comprise data representing audio information and the current packet is representative of the start of a talk-spurt if the measured elapsed time is greater than the predetermined value, and wherein the predetermined value is indicative of a silent interval between packets exceeding a minimum value.

7. The apparatus of claim 6 wherein the means for dynamically applying a build-out time delay plays out the packets by forming a signal representing compressed data from the received packets.

8. The apparatus of claim 7 wherein the formed signal conforms to ADPCM encoding.

9. Apparatus comprising:

a processor for providing a stream of packets;

a packet processor for receiving the steam of packets and playing out the received stream of packets using a dynamic build-out delay;

wherein the processor is an asynchronous transfer mode (ATM) processor, which provides the stream of packets from received ATM cells; and wherein the packet processor measures an elapsed time between a play-out time a prior packet and a received time for a current packet, and if the measured elapsed time is greater than a predetermined value applies a build-out delay to the current packet for use when playing out the current packet; wherein the packets comprise data representing audio information and the current packet is representative of the start of a talk-spurt if the measured elapsed time is greater than the predetermined value; and wherein the predetermined value is indicative of a silent interval between packets exceeding a minimum value.

10. The apparatus of claim 9 wherein the packets conform to ATM Adaptation Layer 2 (AAL-2).

11. The apparatus of claim 9 wherein the packets comprise data representing audio information.

12. Apparatus comprising:

a processor for providing a stream of packets;

a packet processor for receiving the stream of packets and playing out the received stream of packets using a dynamic build-out delay;

wherein the packet processor measures an elapsed time between a play-out time of a prior packet and a received time for a current packet, and if the measured elapsed time is greater than a predetermined value applies a build-out delay to the current packet for use when playing out the current packet, wherein the packets comprise data representing audio information and the current packet is representative of the start of a talk-spurt if the measured elapsed time is greater than the predetermined value and wherein the predetermined value is indicative of a silent interval between packets exceeding a minimum value.

* * * * *